Nov. 17, 1959
E. IANNELLI
2,913,633
ELECTRONIC PLUG-IN ASSEMBLY STRUCTURE
Filed Nov. 30, 1954
2 Sheets-Sheet 1
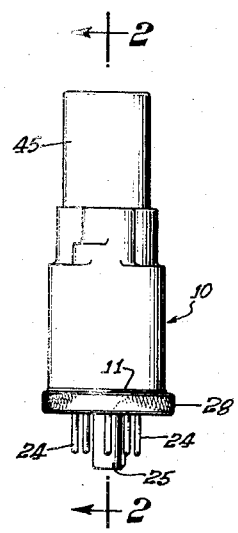
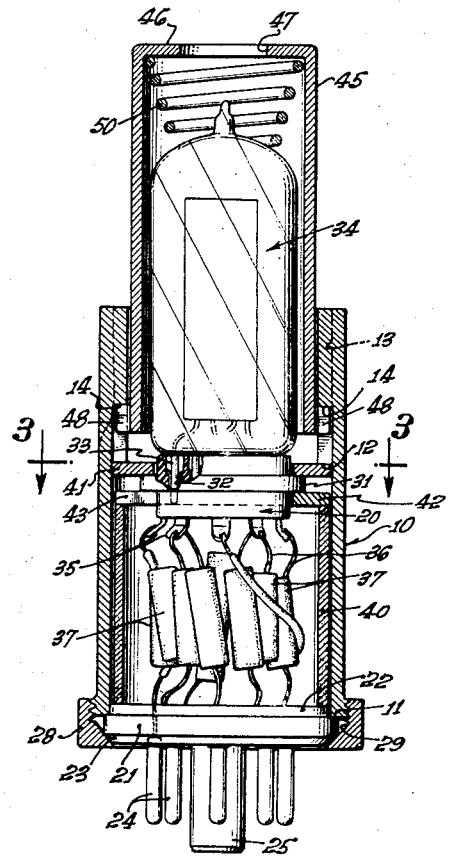
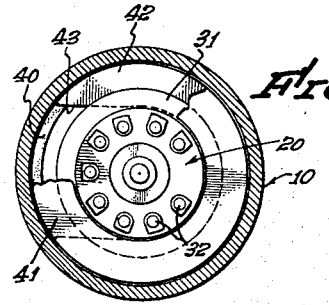
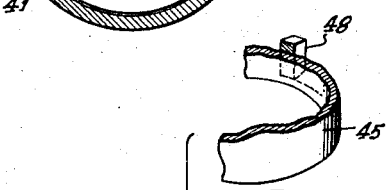
EDWARD IANNELLI,
INVENTOR.
BY *Rud b Lawlor*
ATTORNEY.

Nov. 17, 1959     E. IANNELLI     2,913,633
ELECTRONIC PLUG-IN ASSEMBLY STRUCTURE
Filed Nov. 30, 1954     2 Sheets-Sheet 2
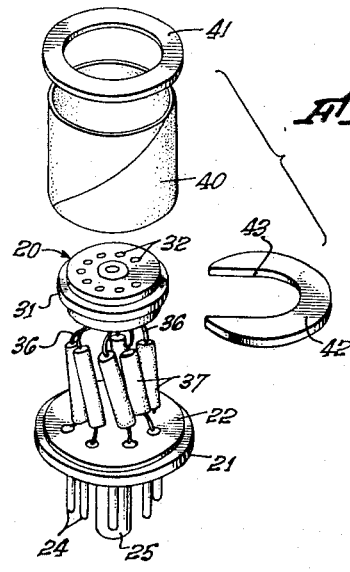
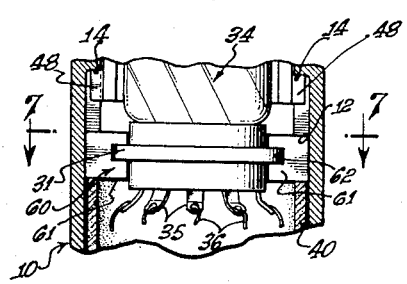
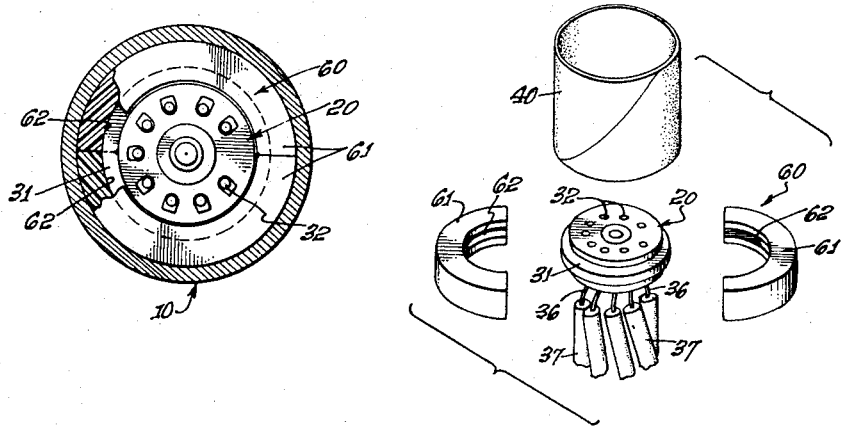
EDWARD IANNELLI,
INVENTOR.
BY
ATTORNEY.

United States Patent Office 2,913,633
Patented Nov. 17, 1959

2,913,633

ELECTRONIC PLUG-IN ASSEMBLY STRUCTURE

Edward Iannelli, Los Angeles, Calif., assignor to Electronic Engineering Company of California, a corporation of California Application November 30, 1954, Serial No. 472,013

12 Claims. (Cl. 317—101)

This invention relates generally to the electronic art and more particularly to a plug-in assembly or unit of the type having a casing or housing, a base plug at one end for plugging into a socket of an electronic circuit, a tube socket disposed within the casing and spaced above the base plug for receiving an electronic tube, and wires, resistors, capacitors, etc., connected between the terminals of the base plug and tube socket.

One object of the invention is to provide a plug-in unit of the general character referred to above which includes a removable tubular insulation liner which surrounds the wires, resistors, capacitors, transformers or other electronic components connected between the base plug-in and the tube socket, so as to prevent shorting of the same to the metal casing or housing.

Another object of the invention is to provide a plug-in unit of the type indicated in which the tubular insulation liner is readily installed in and removed from the casing of the unit when it is desired to disassemble the unit for servicing or modification, said liner, when installed within the casing, providing a tubular mechanical support or connector engaging between the base plug and the tube socket.

Another object of the invention is to provide a plug-in unit, of the character referred to, in which the casing has an annular internal shoulder adjacent its upper end, the unit including a flat ring mountable on the upper face of an annular flange formed at the upper end of the tube socket and engageable against the internal shoulder of the casing to limit upward movement of the socket within the casing.

Another object of the invention is to provide a plug-in unit of the class specified which includes a U-shaped connector element, insertable transversely into position between the annular shoulder of the tube socket and the upper end of the insulation liner so as to maintain the tubular liner downwardly against the base plug of the unit to provide a rigid connection between these parts.

Another object of the invention is to provide a plug-in unit of the type specified which includes an internally-threaded clamping ring or cap which is adapted to be screwed onto the lower threaded end of the casing and against the base plug so as to clamp the latter against the lower end of the casing and to hold the tubular insulation liner seated against the U-shaped connector element.

A further object of the invention is to provide a unit, of the type referred to, in which the tubular casing is adapted to receive the lower open end of a tube shield, the interior of the casing having bayonet grooves for receiving lugs on the shield to releasably lock these parts together, a spring being interposed between the top of the tube and the upper end of the shield and operative to urge the latter upwardly to maintain its lugs securely seated in the bayonet grooves.

A further object of the invention is to provide a plug-in unit in which may be embodied a connector element of alternative structure, said element consisting of a two-part ring, each half having a semicircular groove to adapt it to embrace one-half of the peripheral flange on the tube socket, the two-part-ring engaging between the internal shoulder of the casing and the upper end of the insulation tube.

A still further object of the invention is to provide a plug-in unit which is highly practical and efficient in use, one which is of relatively simple construction, economical to produce, and easily and quickly assembled and disassembled.

Further objects will appear from the following description and from the drawings which are intended for the purpose of illustration only, and in which:

Figure 1 is a side elevational view of the improved plug-in unit;

Fig. 2 is an enlarged vertical sectional view of the unit, taken on line 2—2 of Fig. 1;

Fig. 3 is a cross-sectional view, taken on line 3—3 of Fig. 2;

Fig. 4 is an enlarged fragmentary perspective view of the upper portion of the unit;

Fig. 5 is a perspective view of several of the parts of the unit in disassembled relation;

Fig. 6 is an enlarged vertical sectional view of a portion of the unit, showing an alternative form of connector element;

Fig. 7 is a cross-sectional view, taken on line 7—7 of Fig. 6; and

Fig. 8 is a view similar to Fig. 5, showing the alternative connector element of Figs. 6 and 7.

Referring first to Figs. 1 through 5 in detail, the present improved plug-in unit includes a tubular metal casing or housing 10 provided at its lower end with a lower, slightly enlarged, screw-threaded portion 11. As shown in Figs. 2 and 4, the upper portion of the casing 10 is slightly reduced in diameter, thus providing an annular internal shoulder 12. Above the shoulder 12, the casing 10 is provided with at least two vertical grooves 13 (Fig. 4) which communicate with shorter vertical grooves 14 spaced alongside the grooves 13 with depending partitions 15 therebetween. The grooves 13 and 14 cooperate in providing bayonet slots for the purpose to be later explained.

The plug-in unit also includes a tube socket 20 located within an intermediate portion of the casing 10 and a base plug 21 which is positioned at the lower end of the casing. The base plug 21 consists of a disc of dielectric material adapted to abut the lower end of the casing 10 and having an upper reduced portion 22 fitting within the end of the casing to axially align the plug and casing. The lower edge of the base plug disc 21 is chamfered as indicated at 23 in Fig. 2. The base plug also has conventional plug-in elements 24 and an axial centering or pilot lug 25.

Adapted to be screwed onto the threaded end 11 of the casing 10 is an internally screw-threaded, metal ring or cap 28 having a knurled periphery. The lower portion of the cap is provided with a tapered bore or seat 29. With the base plug 21 seated against the lower end of the casing 10, the cap is screwed onto the end 11 to cause its seat 29 to engage the chamfer 23 of the base plug so as to clamp the base plug firmly against the casing.

The tube socket 20 consists of a cylindrical, insulating body having a peripheral flange 31 intermediate its upper and lower ends. The socket 20 has conventional spring-type socket elements 32 for receiving the prongs 33 of an electronic tube 34. Electrically connected to the socket elements 32 and projecting downwardly from the socket 20 are terminals 35. Wires 36 extend between the prongs 33 and the plug-in elements 24 of the base plug 21 and are soldered thereto. Interposed in certain of the wires 36 are electronic circuit components 37, such as resistors, capacitors, transformers, coils, etc. The tube socket 20, wires 36, components 37 and base plug 21 are usually assembled separately from the rest of the unit and together constitute a unitary subassembly for insertion into the casing 10.

The invention provides means for covering or enclosing the wires 36 and components 37 so as to shield them against shorting to the metal casing 10. This means consists simply of a tubular liner 40 made from fiber or other dielectric, moisture-resistant material possessing considerable compressive strength. As shown in Fig. 2, the liner 40 is of a diameter to fit closely within the casing 10, the lower end of the liner resting upon the upper portion 22 of the base plug 21.

It is highly desirable that the components 21, 36, 37, 20 and 40 be insertable into and removable from the casing as a unit. For this reason, the invention contemplates the provision of connector means for releasably locking these components together. In one form of the invention, the connector means includes a flat metal ring 41 having an outside diameter of a size to fit closely within the tubular casing 10 directly against the shoulder 12, and an internal diameter to adapt the ring to encircle the upper end of the tube socket 20 and to rest directly upon the flange 31 thereof.

The connector means also includes a horseshoe- or U-shaped connector element 42 which is simply a flat metal ring having a cut-out 43 at one side. The outer peripheral portion of the slotted ring 42 is adapted to rest directly against the upper end of the liner 40 and the sides of the slot 43 closely embrace the periphery of the tube socket 20 below the flange 31 to support the tube socket from the liner 40 and base plug 21.

A tube shield 45 may be employed for enclosing the electronic tube 34. The shield 45 is a metal cylinder having an outer diameter slightly less than the inside diameter of the casing 10 to adapt it to fit therein. The shield may have its upper end 46 provided with an inspection and ventilation hole 47 through which light emanating from the tube is visible. At its lower open end, the tube shield 45 has laterally projecting lugs 48 which, when the shield is lowered into the upper end of the casing 10, enter and slide downwardly in the grooves 13. By forcing the shield downwardly, against the action of a coil spring 40 pocketed within the shield and engaging between the upper end 46 of the shield and the upper end of the tube 34, and turning the shield slightly, the lugs 48 are caused to move across the partitions 15 and into the bayonet grooves 14 where they are yieldingly retained by the spring 50.

Assuming that the wires 36 and electronic components 37 have been connected between the terminals 35 and prongs 24, the sub-assembly 20, 21, 36, 37 is ready for installation in the casing 10. However, before inserting this unit, the liner 40 is first slid over the tube socket 20 (Fig. 5) to cause its lower end to rest upon the portion 22 of the base plug 21. The U-shaped connector element 42 is next slid laterally into the space existing between the flange 31 of the tube socket 20 and the upper end of the liner tube 40. The tube socket 20 thus is supported by the element 42, liner 40 and base plug 21 and the wires 36 may be tensioned very slightly. The ring 41 is then placed upon the flange 31 of the tube socket 20 to complete the assembly.

The assembly, including the several parts 41, 40, 20, 42, 36, 37 and 21, is slid into the casing 10, or the casing slid thereover as preferred. Eventually, the ring 41 abuts the internal shoulder 12 of the casing to limit such inward movement. With the parts thus installed, the cap ring 28 is screwed onto the lower threaded end 11 of the casing 10 and set up against the chamfered end of the base plug 21. Such engagement of the cap 28 against the base plug 21 serves to clamp the parts within the casing with a relatively tight fit so as to preclude shaking thereof due to vibration or jarring.

With the tube socket 20 thus firmly supported and backed up by the liner 40 and other parts, the tube 34 may be connected to the socket by pressing the prongs 33 into the resilient socket elements 43. The tube shield 45 may then be applied to the casing 10 in the manner explained above to shield the tube against outside electrical interference. The entire plug-in unit may then be installed in an electronic device, instrument or other apparatus by simply forcing the prongs 24 into a socket (not shown) forming part of the apparatus.

When it is desired to replace the tube 34, the shield 45 is removed, after which the tube 34 may be removed by pulling it upwardly and a new tube inserted, after which the shield is installed in place. When it becomes necessary to service the plug-in unit or to modify the circuits by changing any of the components 37, the entire unit is first disconnected from the electronic circuit in which it is embodied, after which the shield 45 is removed. The cap ring 28 is next unscrewed and removed to release the remaining parts. The unit 21, 36, 37, 20, 40, 42, 41 and 34 is then slid out from the casing 10. To gain access to the wiring 36, 37, it is, of course, necessary to remove the liner 40 and this is accomplished by removing the U-shaped connector element 42 laterally, removing the tube 34 and ring 41. With the parts thus unlocked, the liner may be slid upwardly over the tube socket 20. After servicing or modifying the unit, the parts are reassembled by reversing the procedure outlined above.

Referring now to Figs. 6 to 8, the invention also contemplates an alternative plug-in structure in which a connector means 60 of modified form is employed. This means consists of a pair of connector elements in the form of half-rings 61. Each half-ring 61 is in the form of a semicircle and has an internal groove 62 arranged concentrically of the periphery. The half-rings 61 are adapted to be placed against opposite sides of the tube socket 20 to form a complete annular collar therearound with the flange 31 received in the grooves 62.

It will be observed that in the alternative construction the element 60 takes the place of both the ring 41 and U-shaped locking element 42. That is, the half-rings 61 are so shaped and dimensioned that they interlock between the shoulder 12 and the upper end of the liner 40 and also support the tube socket 20 by reason of the engagement of the flange 31 in the groove 62. Thus, by this alternative construction, the two-part element 60 performs the function of both elements 41 and 42 and assembly and disassembly of the plug-in unit is simplified.

The invention claimed is:

1. An electronic plug-in unit, comprising: a tubular casing having a threaded end; a tube socket; a base plug having a reduced portion; circuit components mounted and connected between said socket and said base plug; said socket, said connector means, said components and said base plug, constituting an assembly that is removably insertable axially into said casing with said reduced portion within an end of said casing; connector means removably engageable between said socket and said tubular casing for maintaining said socket, said connector means, said components and said base plug, firmly mounted in said casing with said reduced portion within an end of said casing and with said reduced portion abutting said end of the casing, said components being insulated from said casing; and a cap ring for screwing onto said threaded end for engaging said base plug to retain the latter in abutting relation with said casing.

2. An electronic plug-in unit, comprising: a tubular casing having a threaded end; a tube socket; a base plug having a reduced portion; wires connected between said socket and said base plug; a tubular insulation liner supported upon said reduced portion and surrounding said wires; connector means removably engageable between said socket and one end of said liner for maintaining said liner seated against said reduced portion; said socket, connector means, wires, base plug and liner constituting an assembly that is removably insertable axially into said casing with said reduced portion within an end of said casing and with said reduced portion abutting said end of the casing; a cap ring for screwing onto said threaded end and engaging said base plug to retain the latter in abutting relation with said casing; said casing having an internal, annular shoulder, said tube socket having a peripheral flange, and said connector means including a ring placeable upon said flange and engageable between said shoulder and said flange; and a U-shaped element for embracing said tube socket between said flange and said one end of said liner.

3. A plug-in unit as in claim 2, wherein said U-shaped element engages under said peripheral flange of said tube socket at the outer face of said U-shaped element, and the inner face of said U-shaped element bears upon the top of said tubular insulation liner, thereby binding said liner between said base plug and said tube socket.

4. An electronic plug-in unit, comprising: a tubular casing having a threaded end; a tube socket; a base plug having a reduced portion; wires connected between said socket and said base plug; a tubular insulation liner supported upon said reduced portion and surrounding said wires; connector means that is removably engageable between said socket and one end of said liner for maintaining said liner seated against said reduced portion; said socket, connector means, wires, base plug and liner constituting an assembly insertable axially into said casing with said reduced portion within an end of said casing and with said reduced portion abutting said end of the casing; a cap ring for screwing onto said threaded end and engaging said base plug to retain the latter in abutting relation with said casing; said casing having an internal, annular shoulder, said tube socket having a peripheral flange, said connector means consisting of a pair of half-rings each having an internal, arcuate groove, said half-rings being placeable around said tube socket with said flange disposed within said grooves, said half-rings being engageable between said flange and said shoulder and also between said flange and said one end of said liner.

5. An electronic plug-in unit, comprising: a tubular casing having a threaded end; a tube socket; a base plug having a reduced portion; circuit components mounted and connected between said socket and said base plug; a tubular insulation liner supported upon said reduced portion and surrounding said components; connector means engageable between said socket and one end of said liner for maintaining said liner seated against said reduced portion, said socket, connector means, said components, said base plug and said liner constituting an assembly removably insertable axially into said casing with said reduced portion within an end of said casing and with said reduced portion abutting said end of the casing, said tube socket having a peripheral flange, and said connector means including a U-shaped element for embracing said tube socket beneath said flange and for engaging between said flange and said one end of said liner; and a cap ring for screwing onto said threaded end and for engaging said base plug to retain the latter in abutting relation with said casing.

6. An electronic plug-in unit, comprising: a tubular casing having a threaded end; a tube socket; a base plug having a reduced portion; circuit components mounted and connected between said socket and said base plug; a tubular insulation liner supported upon said reduced portion and surrounding said components; connector means engageable between said socket and one end of said liner for maintaining said liner seated against said reduced portion, said socket, connector means, said components, said base plug and said liner constituting an assembly removably insertable axially into said casing with said reduced portion within an end of said casing and with said reduced portion abutting said end of the casing, said casing having an internal annular shoulder, said tube socket having a peripheral flange, and said connector means being engageable between said flange and shoulder and between said flange and said one end of said liner; and a cap ring for screwing onto said threaded end and for engaging said base plug to retain the latter in abutting relation with said casing.

7. An electronic plug-in unit, comprising: a tubular casing having a threaded end; a tube socket; a base plug having a reduced portion; circuit components mounted and connected between said socket and base plug; a tubular insulation liner supported upon said reduced portion and surrounding said components; connector means engageable between said socket and one end of said liner for maintaining said liner seated against said reduced portion, said socket, connector means, said components, said base plug and said liner constituting an assembly removably insertable axially into said casing with said reduced portion within an end of said casing and with said reduced portion abutting said end of the casing, said casing having an internal, annular shoulder, said tube socket having a peripheral flange, and said connector means including a ring placeable upon said flange and engageable between said shoulder and said flange; a U-shaped element for embracing said tube socket beneath said flange and for engaging between said flange and said one end of said liner; and a cap ring for screwing onto said threaded end and for engaging said base plug to retain the latter in abutting relation with said casing.

8. An electronic plug-in unit, comprising: a tubular casing having a threaded end; a tube socket; a base plug having a reduced portion; circuit components mounted and connected between said socket and said base plug; a tubular insulation liner supported upon said reduced portion and surrounding said components; connector means engageable between said socket and one end of said liner for maintaining said liner seated against said reduced portion, said socket, connector means, said components, said base plug and said liner constituting an assembly removably insertable axially into said casing with said reduced portion within an end of said casing and with said reduced portion abutting said end of the casing, said casing having an internal, annular shoulder, said tube socket having a peripheral flange, and said connector means consisting of a pair of half-rings, each having an internal, arcuate groove, said half-rings being placeable around said tube socket with said flange disposed in said grooves, said half-rings being engageable between said flange and said shoulder and also between said flange and said one end of said liner; and a cap ring for screwing onto said threaded end and engaging said base plug to retain the latter in abutting relation with said casing.

9. An electronic plug-in unit, including: a tubular casing having one end threaded externally, and the other end of the casing being reduced to provide an internal overhanging shoulder; a base plug having a reduced portion; a tube socket of diameter reduced to less than that of said base plug and aligned with said reduced portion of said casing and having a reduced outer portion lying within the zone of said overhanging internal shoulder; circuit components mounted and connected between said base plug and said tube socket; a tubular insulation liner surrounding said circuit components and mounted between said base plug and tube socket within said casing, one end of said liner bearing on said base plug; separate connector means removably bearing on the other end of said liner and engaging said socket to maintain said socket positioned with respect to said base plug; additional connector means connected with said internal shoulder of said casing and bearing upon an outward portion of said tube socket, said plug, socket, connector means, circuit components and liner being insertable as a removable unit into said casing; and a cap ring threaded onto said threaded end of said casing and retaining said removable unit in said casing.

10. An electronic plug-in unit as in claim 9, wherein said reduced end of said casing provides an outstanding sleeve portion for receiving a mounting end of a tube, and an electronic tube is mounted in said tube socket and has a portion thereof disposed in said outstanding sleeve portion.

11. An electronic plug-in unit as in claim 9, wherein said sleeve portion provides mounting means for a tube shield, and a tube shield is removably mounted about said tube in such shield mounting means.

12. A plug-in unit as in claim 9, wherein said additional connector means is a washer removably engaging said tube socket.

References Cited in the file of this patent
UNITED STATES PATENTS

| | | |
|---|---|---|
| 1,554,501 | Horle et al. | Sept. 22, 1925 |
| 1,825,534 | Mavrogenis | Sept. 29, 1931 |
| 1,973,248 | Evans | Sept. 11, 1934 |
| 2,186,184 | Tubbs | Jan. 9, 1940 |
| 2,247,386 | John | July 1, 1941 |
| 2,325,770 | Henderson | Aug. 3, 1943 |
| 2,398,626 | Del Camp | Apr. 16, 1946 |
| 2,532,538 | Burtt | Dec. 5, 1950 |
| 2,628,270 | Himmel | Feb. 10, 1953 |
| 2,637,763 | Palmer | May 5, 1953 |
| 2,737,579 | Wehrlin et al. | Mar. 6, 1956 |
| 2,764,713 | Alden | Sept. 25, 1956 |
| 2,807,659 | Woods | Sept. 24, 1957 |